United States Patent
Hussain et al.

(10) Patent No.: US 8,843,829 B2
(45) Date of Patent: Sep. 23, 2014

(54) METHOD AND SYSTEM FOR WEB BROWSING

(75) Inventors: Zafar Hussain, Bangalore (IN); Pushparajan Vijayakumar, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 882 days.

(21) Appl. No.: 12/625,662

(22) Filed: Nov. 25, 2009

(65) Prior Publication Data

US 2010/0131871 A1 May 27, 2010

(30) Foreign Application Priority Data

Nov. 25, 2008 (IN) .......................... 2939/CHE/2008

(51) Int. Cl.
*G06F 3/048* (2013.01)
*G06F 17/30* (2006.01)

(52) U.S. Cl.
CPC ................................ *G06F 17/30884* (2013.01)
USPC ............................ 715/738; 715/745; 715/811

(58) Field of Classification Search
CPC .................... G06F 17/30867; G06F 17/30905; G06F 17/3089
USPC ........................ 715/760, 811, 789, 738, 745
See application file for complete search history.

(56) References Cited

U.S. PATENT DOCUMENTS

| | | | | |
|---|---|---|---|---|
| 6,834,297 B1 * | 12/2004 | Peiffer et al. | ................ | 709/219 |
| 7,181,459 B2 * | 2/2007 | Grant et al. | ........................... | 1/1 |
| 7,540,051 B2 * | 6/2009 | Gundersen et al. | .................. | 1/1 |
| 7,620,628 B2 * | 11/2009 | Kapur et al. | .......................... | 1/1 |
| 7,783,642 B1 * | 8/2010 | Feng et al. | .................... | 707/739 |
| 7,949,646 B1 * | 5/2011 | Bangalore et al. | ............ | 707/708 |
| 2002/0038365 A1 * | 3/2002 | Yeh | ............................... | 709/224 |
| 2002/0087599 A1 * | 7/2002 | Grant et al. | ................... | 707/513 |
| 2005/0257156 A1 * | 11/2005 | Jeske et al. | .................... | 715/745 |
| 2006/0041549 A1 * | 2/2006 | Gundersen et al. | ............... | 707/5 |
| 2006/0122979 A1 * | 6/2006 | Kapur et al. | ...................... | 707/3 |
| 2008/0097864 A1 * | 4/2008 | Patel et al. | ...................... | 705/26 |
| 2008/0177774 A1 * | 7/2008 | Ruckart et al. | ................ | 707/102 |
| 2010/0057739 A1 * | 3/2010 | Charka et al. | ..................... | 707/7 |

* cited by examiner

*Primary Examiner* — Daeho Song
(74) *Attorney, Agent, or Firm* — Cha & Reiter, LLC.

(57) ABSTRACT

A method and system for web browsing is provided. The method includes creating one or more browsing profiles, automatically categorizing contents based on the one or more browsing profiles. The system includes one or more remotely located electronic devices and a communication interface in electronic communication with the one or more electronic devices. Furthermore, the system includes a storage device for storing data associated with the one or more electronic devices and a processor for web browsing, and a creating unit for creating one or more browsing profiles and automatically categorizing contents based on the one or more browsing profiles.

9 Claims, 5 Drawing Sheets

METHOD AND SYSTEM FOR WEB BROWSING

CLAIM OF PRIORITY

This application claims the benefit of the earlier filing date, pursuant to 35 USC §119, to that patent application entitled "Method And System For Web Browsing" filed in the Indian Patent Office on Nov. 25, 2008 and assigned Serial No. 2939/CHE/2008, the contents of which are hereby incorporated by reference.

BACKGROUND

Almost all Hypertext systems, including web browsers, provide a facility to create a list of particular sites for quick and easy access. The list is referred as "hotlist" and typically includes a bookmark list, a favorites list, and a history list. Each entry within the hotlist includes a set of Uniform Resource Locators (URLs), which typically identifies the content of a web page. To maintain the hotlist, a user has to manually add, modify or delete the URLs. When a user has a huge collection of URLs corresponding to different profiles in the hotlist, such as news, traveling, shopping, and etc., the user has to manually go through myriads of URLs with multiple profiles in order to select the desired URL listed from the hotlist. As a result, accessing the URL from the hotlist having multiple profiles becomes troublesome due to required manual intervention.

Accordingly, there is a need for providing an efficient technique for web browsing.

SUMMARY

Embodiments of the present disclosure described herein provide a method and system for web browsing.

According to one aspect of the invention, a method for web browsing in an electronic device includes creating one or more browsing profiles. The method also includes automatically categorizing contents based on the one or more browsing profiles and displaying the one or more browsing profiles and the contents associated with at least one browsing profile of the one or more browsing profiles.

According to another aspect of the invention, a system for web browsing in an electronic device includes one or more remotely located electronic devices; a communication interface in electronic communication with the one or more electronic devices; a storage device for storing data associated with the one or more electronic devices and a processor. The processor includes a creating unit for creating one or more browsing profiles and automatically categorizing contents based on the one or more browsing profiles. Furthermore, the system includes a display for displaying the one or more browsing profiles.

BRIEF DESCRIPTION OF FIGURES

The accompanying figures, similar reference numerals may refer to identical or functionally similar elements. These reference numerals are used in the detailed description to illustrate various embodiments and to explain various aspects and advantages of the present disclosure.

Note that persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION

It should be observed that method steps and system components have been represented by conventional symbols in the figures, showing only specific details that are relevant for an understanding of the present disclosure. For the purposes of clarity and simplicity, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Figure 1:
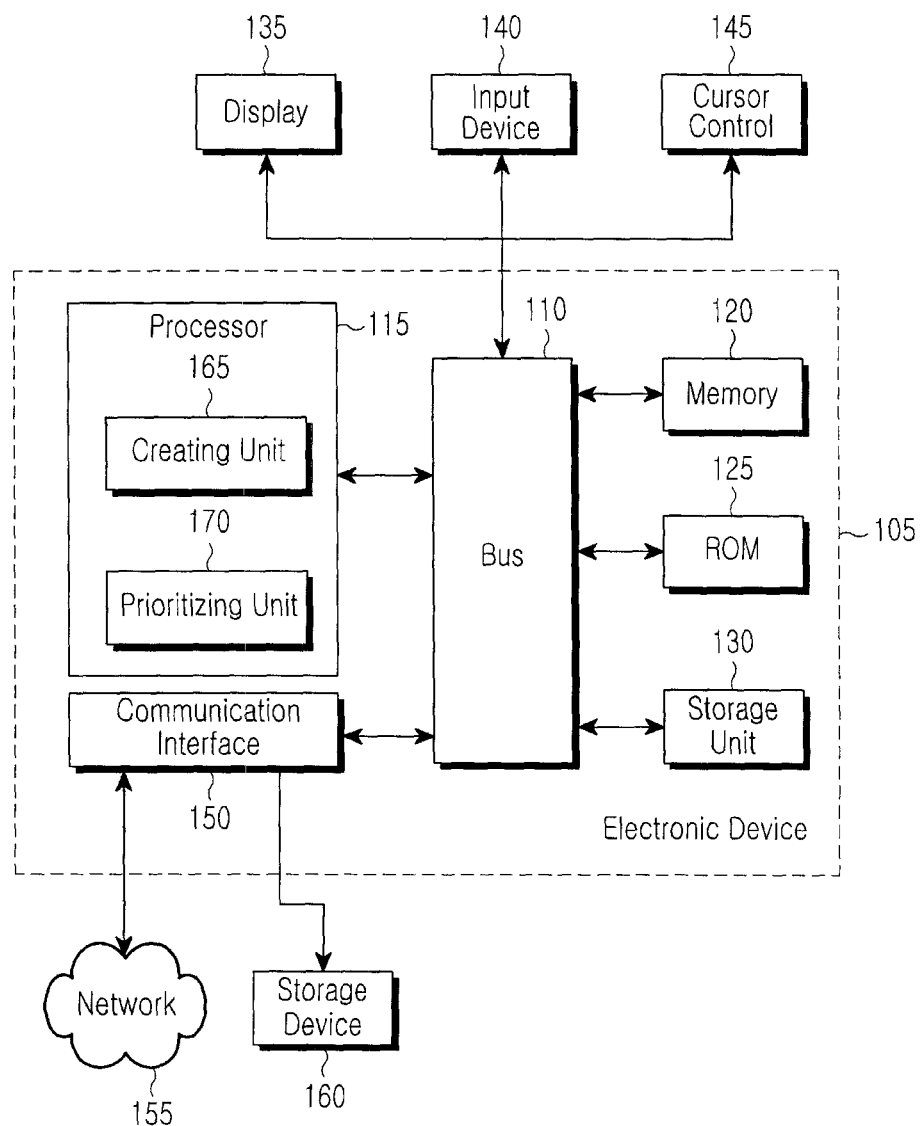
FIG. 1 is a block diagram of an electronic device, in accordance with an exemplary embodiment of the present invention.

FIG. 1 is a block diagram of the electronic device 105 in accordance with an embodiment of the present invention. It should be noted an electronic device 15 within the context of this disclosure includes, but are not limited to, a lap-top computer, a mobile phone, and other mobile or portable devices, such as a personal digital assistant (PDA), a personal communication assistant (PCA), an electronic organizer, an interactive TV/set-top box remote control, or any duplex interactive devices.

As shown, the electronic device 105 includes a bus 110 or other communication mechanism for communicating information, and a processor 115 coupled with the bus 110. The processor 115 may include an integrated electronic circuit for processing and controlling functionalities of the electronic device 105. The electronic device 105 also includes a memory 120, such as a random access memory (RAM) or other dynamic storage device, coupled to the bus 110 for storing information which can be used by the processor 115. The memory 120 can be used for storing any temporary information required. The electronic device 105 further includes a read only memory (ROM) 125 or other static storage device coupled to the bus 110 for storing static information for the processor 115. A storage unit 130, such as a magnetic disk or optical disk, is provided and coupled to the bus 110 for storing information.

The electronic device 105 can be coupled via the bus 110 to a display 135, such as a cathode ray tube (CRT), a liquid crystal display (LCD) or a light emitting diode (LED) display, for displaying information. An input device 140, including alphanumeric and other keys, is coupled to the bus 110 for communicating an input to the processor 115. The input device 140 may be included in the electronic device 105. Another type of user input device may be a cursor control 145, such as a mouse, a trackball, or cursor direction keys for communicating the input to the processor 115 and for controlling cursor movement on the display 135. The input device 140 may also be included in the display 135, for example, as a touch screen.

Various embodiments are related to the use of the electronic device 105 for implementing the techniques described herein. In one embodiment, the techniques are performed by the processor 115 using information included in the memory 120. The information can be read into the memory 120 from another machine-readable medium, such as the storage unit 130.

The term "machine-readable medium" as used herein refers to any medium that participates in providing data that causes a machine to operate in a specific fashion. In an embodiment implemented using the electronic device 105, various machine-readable medium are involved, for example, in providing information to the processor 115. The machine-readable medium can be a storage media. Storage media includes both non-volatile media and volatile media. Non-volatile media includes, for example, optical or magnetic disks, such as the storage unit 130. Volatile media includes dynamic memory, such as the memory 120. All these type of media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium may be a transmission media including coaxial cables, copper wire and fiber optics, including the wires that include the bus 110. Transmission media can also take the form of acoustic or light waves, such as those generated during radio-wave and infra-red data communications.

The electronic device 105 also includes a communication interface 150 coupled to the bus 110. The communication interface 150 provides a two-way data communication coupling to the network 155. For example, the communication interface 150 can be a Bluetooth port, IRDA port, wired port and wireless ports. In any such implementation, communication interface 150 transmits and receives electrical, electromagnetic or optical signals that carry digital data streams representing various types of information. The communication interface 150 can be a universal serial bus port.

In alternate embodiments, the electronic device 105 may be coupled to the storage device 160 for storing or fetching information. Examples of the storage device 160 includes, but are not limited to, a flash drive, a pen drive, a hard disk or any other storage media. Further, the processor 115 may include one or more processing units, for example, a creating unit 165, and a prioritizing unit 170. The creating unit 165 is used for creating one or more browsing profiles and automatically categorizing contents based on the one or more browsing profiles. The prioritizing unit 170 is used for prioritizing the contents based on one or more parameters. The one or more parameters include at least one of usage of the contents.

In some embodiments, the electronic device 105 may not include the processing units and the functions of the processing units can be performed by the processor 115. However, the teachings of the present invention can be also applied in these embodiments.

Figure 2:
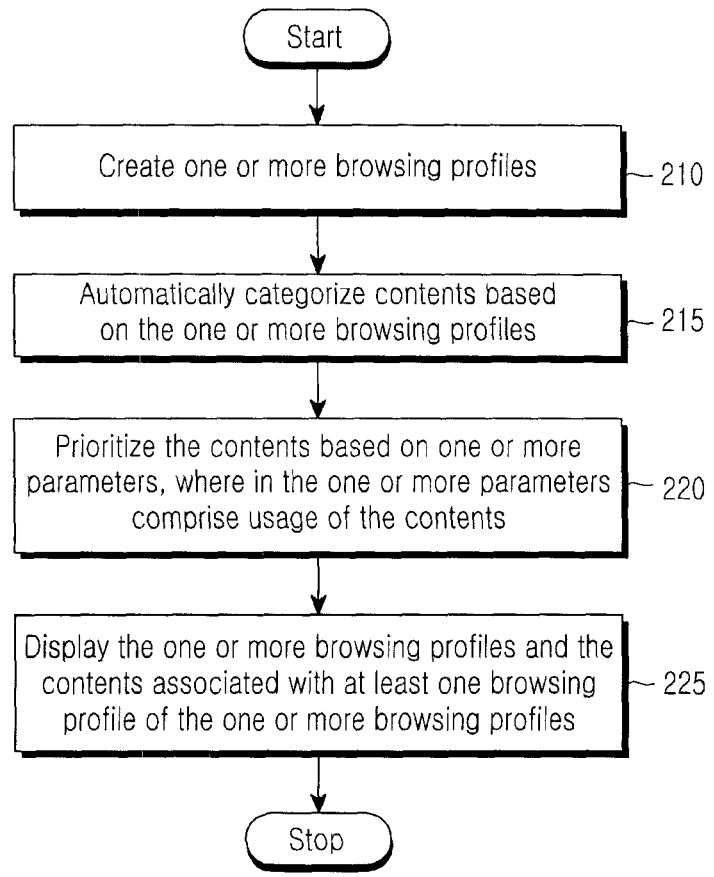
FIG. 2 is a flowchart illustrating a method for web browsing, in accordance with an exemplary embodiment of the present invention.

FIG. 2 is a flowchart illustrating a method for web browsing in accordance with the present invention, and a description thereof will be given below with reference to FIGS. 3 to 5.

Note that various applications, for example web browsers, provide a facility to list items which are frequently used by a user. The list is referred to as "hotlist". Examples of the hotlist include, but are not limited to, a bookmark list, a favorites list, or a history list.

At step 210, one or more browsing profiles are provided in an electronic device. Examples of the browsing profiles include, but are not limited to, a travelling profile, a news profile, a shopping profile, and stocks profile. The browsing profiles are displayed on a screen of the electronic device as illustrated in FIG. 3. Note each browsing profile includes one or more hotlists.

In alternate embodiments, the browsing profiles can be predefined, and can be created by a manufacturer of the electronic device and stored in the electronic device.

At step 215, contents are automatically categorized based on the browsing profiles. Examples of the contents include, but are not limited to, one or more web page, websites, saved web pages and web links.

The automatic categorization is achieved by user's selection. For example, user can select his favorite web page to be included in the shopping profile.

Alternatively, automatic categorization is also achieved by tagging the contents which are visited by a browser. The tagging is based on the properties of the contents and the usage of the contents. Examples of the properties of the content (e.g. web page of web site) include, but are not limited to, Meta tags of the content and domain of the contents. Meta tags are metadata serves to identify web page as containing the "keywords". For example, the web page for www.yatra.com has meta tags containing the "keywords" as shown in Table 1.

TABLE 1

| <meta name="keywords" content="Book Cheap Flights, Book Hotels, Travel Holiday Packages, Hotel Packages, airline ticket, airline reservation, Airline flight, cheap airline, airline travel, cheap airline flight, airline discount ticket, cheap flight, airline flight, flight ticket, cheap flight ticket, cheapest flight, discount flight, Air Ticket, Air Tickets, cheap air ticket, cheap air flight ticket, cheap ticket air travel, discount air ticket, air travel, cheap ticket air travel, discount air travel, cheap air travel, air travel ticket, air travel fare, air travel india, cheap vacation package, vacation package, honeymoon packages, cheap honeymoon, honeymoon hotel" lang="en-US" /> |
|---|

Therefore, automatic categorization of the web page for www.yatra.com can be achieved by checking the content of the meta tags for the web site for www.yatra.com. For example, when a keyword, i.e. Travel Holiday Packages, is checked in the meta tags for the web site for www.yatra.com, then the website for www.yatra.com will be identified as the content associated with the travelling profile. Accordingly, the website for www.yatra.com can be automatically categorized into the travelling profile.

Alternatively, automatic categorization is also achieved by checking a title of web page. For example, a web page for www.yatra.com has the title: Book Lowest Price International Airline ticket Flights, Hotels Reservation, Air Travel Holiday. Therefore, categorizing www.yatra.com under the travelling profile can be achieved by checking at least one words, i.e. ticket or travel, from the title of www.yatra.com web page.

Further, the web page for www.yatra.com can be categorized as the travelling profile based on the www.yatra.com's domain name itself, i.e. www.yatra.com, when www.yatra.com is set as the traveling profile by user.

At step 220, the contents are prioritized based on one or more parameters. Further, the contents are not lost due to prioritization. Examples of the parameters include, but are not limited to, usage of the contents, the number of times the user has visited the content, domain of the content, and time elapsed from the last access of the content. For example, if a user visits www.yahoo.com, www.yahoo.co.in, www.hotmail.com, www.yahoo.co.uk, www.finance.yahoo.com, www.shopping.yahoo.com, any one of the yahoo related websites will be on higher priority when compared to the hotmail website since the user visits more number of contents associated with the yahoo domain when compared to the hotmail domain. Further, the user visits the www.yahoo.com website, and delays in visiting the www.yahoo.com website by some time period, then based on the amount of delay generated by the user to visit the yahoo.com subsequently determines the ranking or prioritizing among the www.yahoo.com related websites. That is, if the user accesses the www.yahoo.com website very frequently, then the prioritization of the www.yahoo.com is higher than other yahoo sites, but if the user delays a subsequent access to the www.yahoo.com than other yahoo sites, the priority of www.yahoo.com will be ranked lower. Further, the contents can be sorted according to the prioritization.

In alternate embodiments, step 220 can be bypassed. For example, if the number of contents under the browsing profile is less than a threshold then the prioritizing can be bypassed. Note that examples of the contents include but are not limited to hotlists, saved pages.

At step 225, the one or more browsing profiles and the contents associated with at least one browsing profile are displayed on the electronic device. The browsing profiles are displayed first. The user of the electronic device can then select a browsing profile and the contents associated with the browsing profile can then be displayed in response to the selection by the user.

Figure 3:
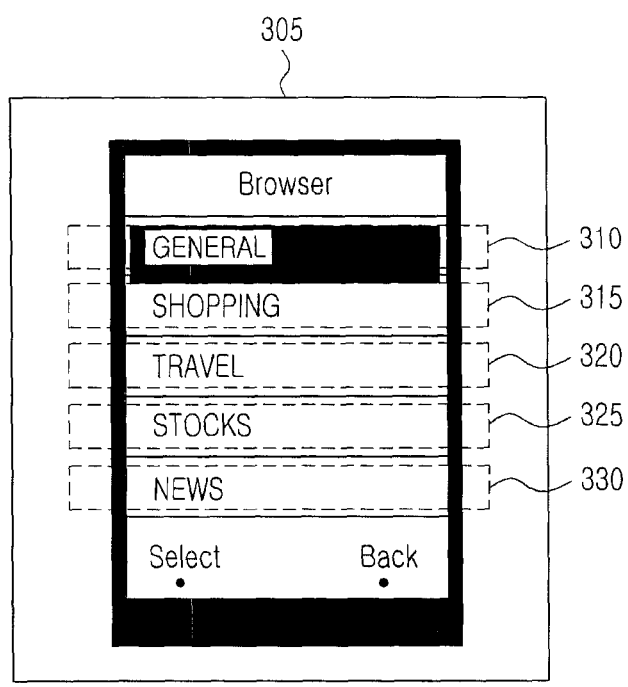
FIG. 3 is an exemplary screen shot illustrating a method for web browsing, in accordance with the present invention.

FIG. 3 is an exemplary screen shot illustrating a method for web browsing in accordance with the present invention.

The electronic device 105 displays a main menu, which includes a browser 305 for web browsing. The browser 305 displays a list of one or more browsing profiles. Example of the browsing profiles include but not limited to a general browsing profile 310, a shopping browsing profile 315, a travel browsing profile 320, a stocks browsing profile 325, and a news browsing profile 330. Each of the browsing profiles includes the associated contents. Examples of the contents include but are not limited to websites or web links or saved pages. In operation, a user can select any one of the browsing profile, and the list of all the contents related to the browsing profile can be streamed in the electronic device 105.

Figure 4A:
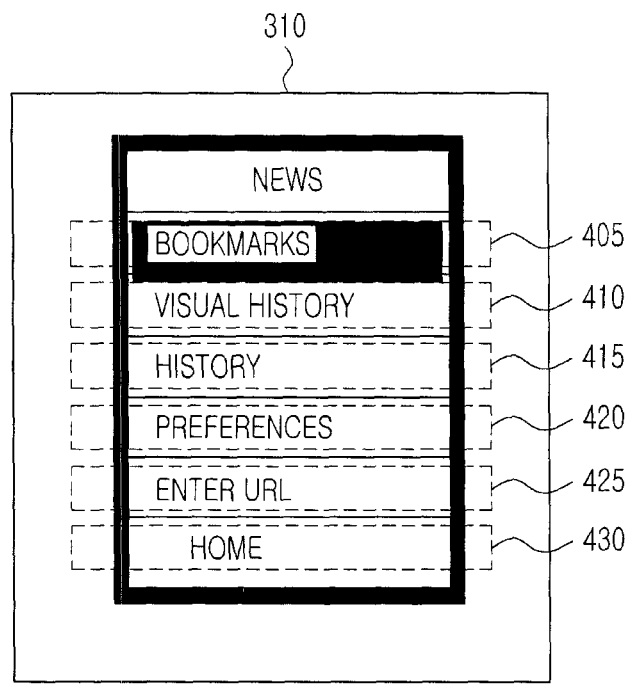
FIG. 4A and FIG. 4B are another exemplary screen shots illustrating a method for web browsing in accordance with the present invention.
Figure 4B:
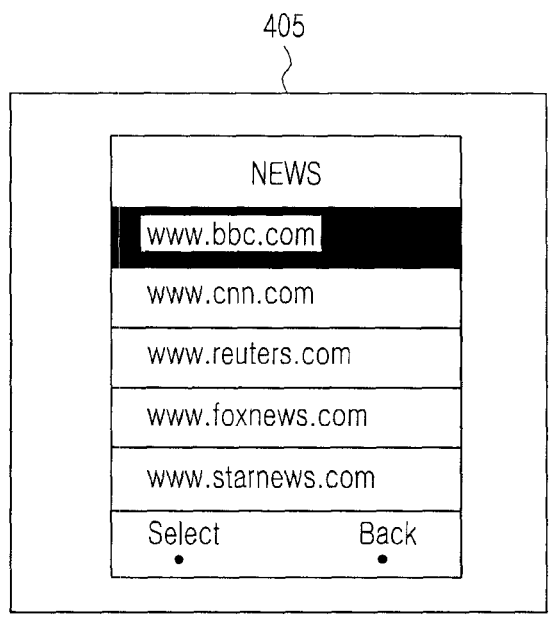

FIG. 4A and FIG. 4B are exemplary screen shots illustrating a method for web browsing in accordance with the present invention.

The electronic device 105 displays the main menu and the user selects the news browsing profile 330. FIG. 4A shows the next window after the selection of news browsing profile which includes a list of hotlists. Example of the hotlists include, but are not limited to, a bookmarks 405, a visual history 410, a history 415, a preferences 420, a enter URL 425 and a home 430. Note that the menu displayed after the selection of the news browsing profile 330 may be same for all the browsing profiles.

In FIG. 4B displays the exploded view of the news browsing profile listing all the contents (e.g. web page) categorized when the bookmarks 405 is selected in FIG. 4A. In detail, FIG. 4B illustrates news browsing profile includes web pages for www.bbc.com, www.cnn.com, www.foxnews.com, starnews.com and etc., wherein the contents is listed in order of the priority according to the operating steps explained earlier with reference to FIG. 2

Figure 5:
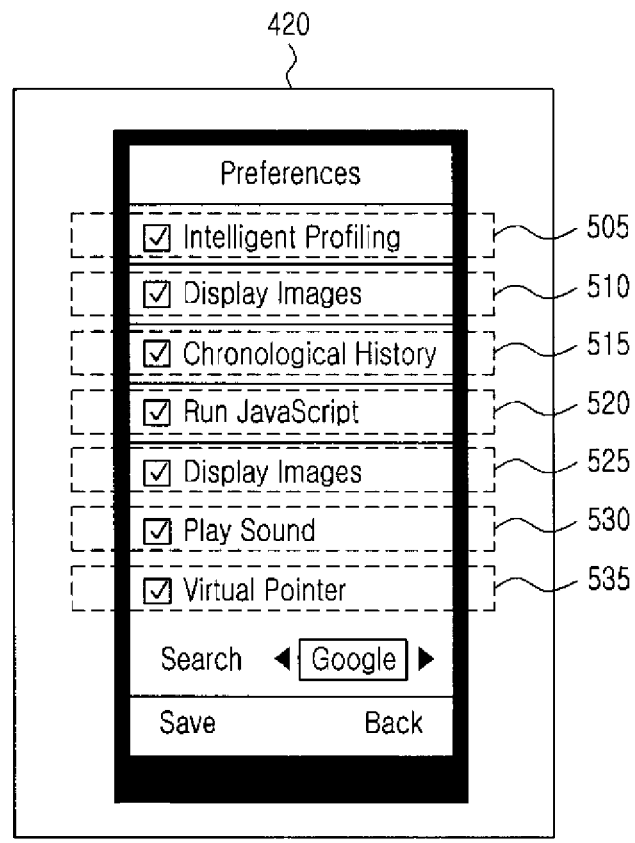
FIG. 5 is another exemplary screen shot illustrating a method for web browsing in accordance with the present invention.

FIG. 5 is an exemplary screen shot illustrating a method for web browsing in accordance with the present invention.

If the user selects the preference 420 from the menu shown in FIG. 4a, the preference window, as shown in FIG. 5, is displayed which shows the menu list for all the browsing profiles. The preference 420 includes an intelligent profiling check box 505, a display images check box 510, and a chronological history check box 515. When the intelligent profile check box 505 is checked, the automatic categorization of contents into the respective browsing profiles can be activated. Furthermore, if the intelligent profiling check box 505 is unchecked then, all web page of sites visited under a corresponding profile are stored in the corresponding profile itself, and the automatic categorization of contents into the respective browsing profiles can be deactivated, thus providing user more control over the profile. Further, the chronological history check box 515 provides options to view the contents of the history hotlist in the chronological order or according to the ranks allotted to the contents based on the usage of the contents as explained earlier with reference to Step 220.

Note that each browsing profile can be further manually customized based on predefined settings or user preferences. For example, various set of options may be enabled or disabled in different profiles. The options may include, but are not limited to "run java script," "display images", "play sound" and use "virtual pointer," which are enabled or disabled by use of the Run Java Script check box 520, Display Images check box 525, Play Sound check box 530 and Virtual Pointer check box 535. "disable java script". Also, different homepages and passwords can also be set for different profiles. Hence, the selectively customizing via manual intervention helps in improving browsing experience.

Generally profiles are to be created either for a functional reason like News, travel etc. However, a user is free to create a profile with a name like "Private". In such a case, the user might prefer that all the sites that he or she visit are not automatically categorized into different profiles. The user can achieve the same by disabling "Intelligent profiling" from the preferences. While browsing in some profile, the user might also manually add a page to private profile, if he or she wishes and might also make this profile password protected.

In some embodiments, the contents in the history of all the browsing profiles can be stored as long as the user erases the contents manually. In cases where such storing leads to breach of memory threshold then the contents can be deleted intelligently. This may be done based on many factors, which also include usage of the page. Further, browsing General profile provides experience similar to normal desktop browsing.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

We claim:

1. A method for web browsing in an electronic device, the method comprising:
    receiving user inputs from a user accessing the electronic device to perform web browsing;
    displaying a list of one or more browsing profiles during the web browsing;
    when contents of the web browsing are visited by the user using a browser operated by the electronic device, automatically categorizing the visited contents of the web browsing based on the listed browsing profiles;
    prioritizing the categorized contents of the web browsing based on one or more parameters selected from the group consisting of: a domain of the contents, use of the contents of the web browsing, frequency of use of the contents of the web browsing and, where contents of the web browsing have been used more than once, an amount of delay between a first and subsequent visit to the contents of the web browsing and a time elapsed from a last use of the contents of the web browsing; and
    when a specific browsing profile is selected by the user from the listed browsing profiles, displaying the selected browsing profile and the prioritized contents of the web browsing associated with the selected browsing profile.

2. The method of claim 1, wherein the creating listed browsing profile comprise at least one of:
    a bookmark section, a home section, a preference section, a uniform resource locator (URL) section and a history section.

3. The method of claim 1, wherein the contents of the web browsing comprise:
    at least one of web links, web page and saved web pages.

4. The method of claim 3, wherein the automatically categorizing comprises:
    checking keywords of meta tags for the contents of the web browsing and automatically categorizing the contents based on the checked keywords.

5. The method of claim 3, wherein the automatically categorizing comprises checking a title of the contents and automatically categorizing the contents of the web browsing based on the checked title.

6. An electronic device for web browsing, the electronic device comprising:
    an input device for receiving user inputs from a user;
    a display for displaying a browser to the user for web browsing based on the received user inputs; and
    a processor, wherein the processor comprises:
        a creating unit for displaying a list of one or more browsing profiles, on the display unit, during the web browsing, and automatically categorizing contents of the web browsing based on the listed browsing profiles when the contents of the web browsing are visited by the browser responsive to the received user inputs; and
        a prioritizing unit for prioritizing the categorized contents of the web browsing based on one or more parameters selected from the group consisting of: a domain of the contents of the web browsing, use of the contents of the web browsing, frequency of use of the contents of the web browsing and, where contents have been used more than once, an amount of delay between a first and subsequent visit to the contents of the web browsing and a time elapsed from a last use of the contents of the web browsing; and
    wherein, when a specific browsing profile is selected by the user from the listed browsing profiles, the display displays to the user the selected browsing profile and prioritized contents of the web browsing associated with the selected browsing profile.

7. The electronic device of claim 6, wherein the contents of the web browsing comprise:
    at least one of web links, web page and saved web pages.

8. The electronic device of claim 6, wherein the processor further comprises:
    checking, by the creating unit, keywords of meta tags for the contents of the web browsing and categorizes automatically the contents of the web browsing based on the checked keywords.

9. The electronic device of claim 8, wherein the processor further comprises checking, by the creating unit, a title of the contents of the web browsing and categorizes the contents of the web browsing based on the checked title.

* * * * *

UNITED STATES PATENT AND TRADEMARK OFFICE
CERTIFICATE OF CORRECTION

| | | |
|---|---|---|
| PATENT NO. | : 8,843,829 B2 | Page 1 of 1 |
| APPLICATION NO. | : 12/625662 | |
| DATED | : September 23, 2014 | |
| INVENTOR(S) | : Zafar Hussain et al. | |

It is certified that error appears in the above-identified patent and that said Letters Patent is hereby corrected as shown below:

In the Claims

Column 7, Claim 2, Line 50 should read as follows:
--...claim 1, wherein the listed...--

Signed and Sealed this
Sixteenth Day of December, 2014

Michelle K. Lee
*Deputy Director of the United States Patent and Trademark Office*